(12) United States Patent
Wu et al.

(10) Patent No.: US 12,119,936 B2
(45) Date of Patent: Oct. 15, 2024

(54) DATA TRANSMISSION METHOD, TERMINAL, AND NETWORK DEVICE

(71) Applicant: VIVO MOBILE COMMUNICATION CO., LTD., Guangdong (CN)

(72) Inventors: Yumin Wu, Dongguan (CN); Xueming Pan, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 566 days.

(21) Appl. No.: 17/196,452

(22) Filed: Mar. 9, 2021

(65) Prior Publication Data

US 2021/0218505 A1    Jul. 15, 2021

Related U.S. Application Data

(63) Continuation of application No. PCT/CN2019/105603, filed on Sep. 12, 2019.

(30) Foreign Application Priority Data

Sep. 21, 2018   (CN) .......................... 201811110032.1

(51) Int. Cl.
    *H04L 1/1812* (2023.01)
    *H04L 5/00* (2006.01)
    *H04W 72/0453* (2023.01)

(52) U.S. Cl.
    CPC .......... *H04L 1/1812* (2013.01); *H04L 5/0053* (2013.01); *H04W 72/0453* (2013.01)

(58) Field of Classification Search
CPC . H04L 1/1812; H04L 5/0053; H04W 72/0453
See application file for complete search history.

(56) References Cited

U.S. PATENT DOCUMENTS

| 10,117,284 | B2 | 10/2018 | Kwon | |
|---|---|---|---|---|
| 2012/0057560 | A1* | 3/2012 | Park | H04L 1/1887 370/328 |
| 2015/0016315 | A1* | 1/2015 | Yang | H04L 1/1861 370/280 |
| 2015/0229448 | A1 | 8/2015 | Cave et al. | |

(Continued)

FOREIGN PATENT DOCUMENTS

| CN | 103141051 A | 6/2013 |
|---|---|---|
| CN | 107896121 A | 4/2018 |

(Continued)

OTHER PUBLICATIONS

First Office Action regarding Japanese Patent Application No. 2021-515631, dated Apr. 13, 2022. Translation provided by Bohui Intellectual Property.

(Continued)

*Primary Examiner* — Jael M Ulysse
(74) *Attorney, Agent, or Firm* — Harness, Dickey & Pierce, P.L.C.

(57) ABSTRACT

A data transmission method includes: obtaining HARQ entities and MAC entities corresponding to a plurality of transmission carriers; and performing data transmission between the transmission carriers and the HARQ entities and MAC entities corresponding to the transmission carriers.

20 Claims, 6 Drawing Sheets

(56) References Cited

U.S. PATENT DOCUMENTS

| | | | |
|---|---|---|---|
| 2017/0134935 A1 | 5/2017 | Wei | |
| 2018/0279262 A1* | 9/2018 | Babaei | H04L 1/1848 |
| 2018/0279358 A1* | 9/2018 | Babaei | H04W 72/0453 |
| 2018/0368132 A1* | 12/2018 | Babaei | H04W 76/11 |
| 2019/0132857 A1* | 5/2019 | Babaei | H04W 72/23 |
| 2019/0141546 A1* | 5/2019 | Zhou | H04L 5/001 |
| 2019/0149380 A1* | 5/2019 | Babaei | H04W 72/23 370/330 |
| 2019/0349932 A1 | 11/2019 | Yu et al. | |
| 2019/0357141 A1 | 11/2019 | Zhao et al. | |
| 2020/0022143 A1* | 1/2020 | Abdoli | H04L 1/1887 |
| 2020/0045684 A1* | 2/2020 | Futaki | H04L 5/0051 |
| 2020/0045730 A1* | 2/2020 | Babaei | H04W 72/23 |
| 2020/0067654 A1* | 2/2020 | Zeng | H04L 1/1861 |
| 2020/0295903 A1* | 9/2020 | Faxér | H04W 24/10 |
| 2021/0127416 A1* | 4/2021 | Matsumura | H04L 1/1822 |
| 2021/0282182 A1* | 9/2021 | Nogami | H04L 1/1614 |
| 2021/0344448 A1* | 11/2021 | Nogami | H04L 1/1812 |

FOREIGN PATENT DOCUMENTS

| | | | |
|---|---|---|---|
| CN | 108270527 A | 7/2018 | |
| EP | 3249844 A1 * | 11/2017 | H04L 1/1812 |
| KR | 20150104963 A | 9/2015 | |
| WO | WO-2017099831 A1 | 6/2017 | |
| WO | WO-2018133860 A1 | 7/2018 | |

OTHER PUBLICATIONS

"Multi-TRP and multi-panel transmission," Ericsson, 3GPP TSG-RAN WG1 NR Ad Hoc #3, R1-1716345, dated Sep. 21, 2017.

"Enabling Multiple NR-PDCCH for Multiple TRP Transmission," Huawei, HiSilicon, 3GPP TSG RAN WG1 Meeting #91, R1-1719816, dated Dec. 1, 2017.

"Mobility in NR Connected-Active," Samsung, 3GPP TSG-RAN WG2 Meeting #96, R2- 167521, dated Nov. 18, 2016.

"NR HARQ model," CATT, 3GPP TSG-RAN WG2 NR Ad Hoc R2-1700197, dated Jan. 19, 2017.

"Physical layer procedures for data (Release 15)," 3GPP TS 38.214, V15.2.0, dated Jun. 2018.

"Radio Resource Control (RRC) protocol specification (Release 15)," 3GPP TS 38.331, V15.2.1, dated Jun. 2018.

Supplementary European Search Report regarding Application No. 19863595.5-1213/3855656, PCT/CN2019/105603, dated Sep. 27, 2021.

First Office Action regarding European Patent Application No. 19863595.5-1213, dated Apr. 5, 2023.

First Office Action regarding Indian Patent Application No. 202127017018, dated Mar. 15, 2022.

First Office Action regarding Korean Patent Application No. 10-2021-7010464, dated Mar. 14, 2023.

ETSI TS 136 321 v 12.4.0, "LTE; Evolved Universal Terrestrial Radio Access (E-UTRA); Medium Access Control (MAC) protocol specification (3GPP TS 36.321 version 12.4.0 Release 12)," dated Feb. 2015.

International Search Report and Written Opinion of the International Searching Authority regarding International Patent Application No. PCT/CN2019/105603, dated Oct. 30, 2019. Translation provided by Bohui Intellectual Property.

"Clarification on starting of drx-HARQ-RTT-TimerDL," Samsung, 3GPP TSG-RAN WG2 Meeting #103, R2-1813048, Aug. 27, 2018.

First Office Action regarding Chinese Patent Application No. 201811110032.1, dated Aug. 4, 2020. Translation provided by Bohui Intellectual Property.

Second Office Action regarding Chinese Patent Application No. 201811110032.1, dated Mar. 2, 2021. Translation provided by Bohui Intellectual Property.

* cited by examiner

DATA TRANSMISSION METHOD, TERMINAL, AND NETWORK DEVICE

CROSS-REFERENCE TO RELATED APPLICATIONS

This application is a Bypass Continuation Application of PCT/CN2019/105603, filed on Sep. 12, 2019, which claims priority to Chinese Patent Application No. 201811110032.1, filed on Sep. 21, 2018, which are incorporated herein by reference in their entirety.

TECHNICAL FIELD

This disclosure relates to the technical field of communication applications, and in particular, to a data transmission method, a terminal, and a network device.

BACKGROUND

In a long term evolution (LTE) or 5th Generation (5G) new radio (NR) system, uplink/downlink data transmission is implemented by using the hybrid automatic repeat request (HARQ).

SUMMARY

According to a first aspect, some embodiments of this disclosure provide a data transmission method, applied to a terminal and including:
  obtaining HARQ entities and medium access control (MAC) entities corresponding to a plurality of transmission carriers, where the transmission carriers include beams or transmission points; and performing data transmission between the transmission carriers and the HARQ entities and MAC entities corresponding to the transmission carriers.

According to a second aspect, some embodiments of this disclosure further provide a data transmission method, applied to a network device and including:
  obtaining HARQ entities and MAC entities corresponding to a plurality of transmission carriers, where the transmission carriers include beams or transmission points; and
  performing data transmission between the transmission carriers and the HARQ entities and MAC entities corresponding to the transmission carriers.

According to a third aspect, some embodiments of this disclosure further provide a terminal, including:
  a processor configured to obtain HARQ entities and MAC entities corresponding to a plurality of transmission carriers, where the transmission carriers include beams or transmission points; and
  a radio frequency unit configured to perform data transmission between the transmission carriers and the HARQ entities and MAC entities corresponding to the transmission carriers.

According to a fourth aspect, some embodiments of this disclosure further provide a terminal, including a memory, a processor, and a computer program stored in the memory and capable of running on the processor, where when the computer program is executed by the processor, the steps of the foregoing data transmission method are implemented.

According to a fifth aspect, some embodiments of this disclosure further provide a network device, including:
  a second obtaining module configured to obtain HARQ entities and MAC entities corresponding to a plurality of transmission carriers, where the transmission carriers include beams or transmission points; and
  a second transmission module configured to perform data transmission between the transmission carriers and the HARQ entities and MAC entities corresponding to the transmission carriers.

According to a sixth aspect, some embodiments of this disclosure further provide a network device, including a memory, a processor, and a computer program stored in the memory and capable of running on the processor, where when the computer program is executed by the processor, the steps of the foregoing data transmission method are implemented.

According to a seventh aspect, some embodiments of this disclosure further provide a non-transitory computer-readable storage medium, where the non-transitory computer-readable storage medium stores a computer program, and when the computer program is executed by a processor, the steps of the foregoing data transmission method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and convey the scope of this disclosure to a person skilled in the art.

The terms "first", "second", and the like in this specification and claims of this application are used to distinguish between similar objects instead of describing a specific order or sequence. It should be understood that the numbers used in this way are interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. The term "and/or" in this specification and claims indicates at least one of connected objects.

Examples provided in the following description are not intended to limit the scope, applicability, or configuration described in the claims. Functions and arrangements of discussed elements may be changed without departing from the spirit and scope of this disclosure. Various procedures or components may be properly omitted, replaced, or added in various examples. For example, the described method may be performed in an order different from the described order, and steps may be added, omitted, or combined. In addition, features described with reference to some examples may be combined in other examples.

Figure 1:
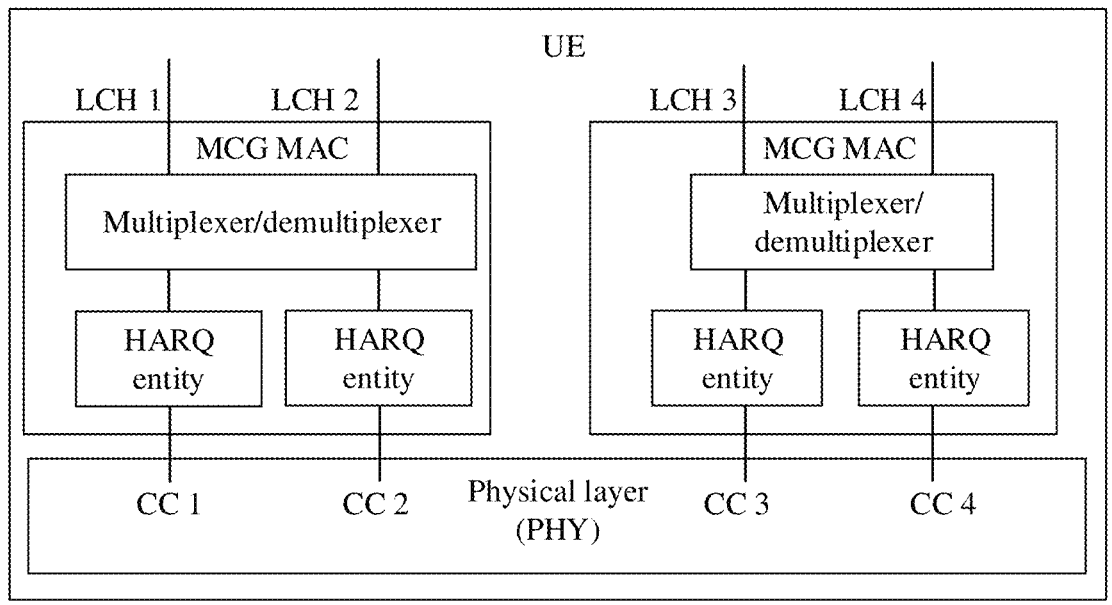
FIG. 1 is a structural block diagram of a MAC entity and a HARQ entity.

As shown in FIG. 1, a terminal or user equipment (UE) may have a plurality of medium access control (MAC) entities (for example, master cell group (MCG) MAC and secondary cell group (SCG) MAC), where each MAC entity has its separate HARQ entity. Each HARQ entity is configured to control data transmission and reception of one cell or frequency channel (for example, a component carrier CC 1 in FIG. 1), that is, data transmission and retransmission of one CC are implemented by using a same HARQ entity. Each HARQ entity has a plurality of HARQ processes (process), and different data is transmitted or received by using different HARQ processes. A quantity of HARQ processes on each CC is determined by a HARQ round trip time (RTT) (which is a time from transmission of data to reception of feedback about the data; if the round trip time is 8 milliseconds, and transmission of each piece of data takes 1 millisecond, a quantity of HARQ processes is 8 in order that data can be transmitted at each time point). A data interface between a MAC entity and an upper-layer entity is a logical channel (LCH), for example, an LCH 1 in FIG. 1. Data on a plurality of logical channels may be transmitted as one MAC protocol data unit (PDU) in a HARQ process by using a multiplexing function.

In a 5G mobile communications system, to achieve a 20 Gbps downlink transmission rate and a 10 Gbps uplink transmission rate, high-frequency communications and massive antenna technologies are introduced. In high-frequency communication, a wider system bandwidth can be provided and an antenna size can be smaller, to facilitate deployment of massive antennas in base stations and UEs. Multi-beam or multiple transmission and reception points (multi-TRP) data transmission and reception are applied on a base station side, and multi-beam or multi-TRP transmission and reception will be extensively applied on a UE side.

However, when different beams or transmission points are used for data transmission and reception for the user equipment (UE), no method is yet available for determining what HARQ transmission mode is to be used.

Figure 2:
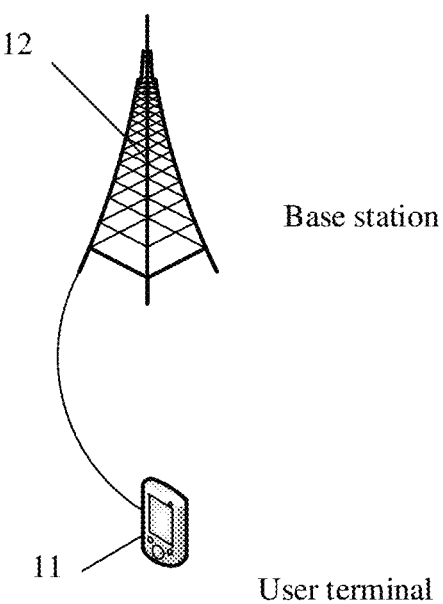
FIG. 2 is a structural diagram of a network system to which some embodiments of this disclosure may be applied.

FIG. 2 is a structural diagram of a network system to which some embodiments of this disclosure may be applied. As shown in FIG. 2, the network system includes a user terminal 11 and a base station 12. The user terminal 11 may be UE, for example, may be a terminal device such as a mobile phone, a tablet computer (Tablet Personal Computer), a laptop computer, a personal digital assistant (PDA), a mobile Internet device (MID), or a wearable device. It should be noted that a specific type of the user terminal 11 is not limited in the embodiments of this disclosure. The base station 12 may be a base station (for example, a gNB or a 5G NR NB) in 5G or a later release, or a base station in another communications system, or is referred to as a NodeB, an evolved NodeB, a transmission and reception point (TRP), or another term in the field. As long as a same technical effect is achieved, the base station is not limited to a specific technical term. It should be noted that only a 5G base station is used as an example in the embodiments of this disclosure, but a specific type of the base station 12 is not limited.

Figure 3:
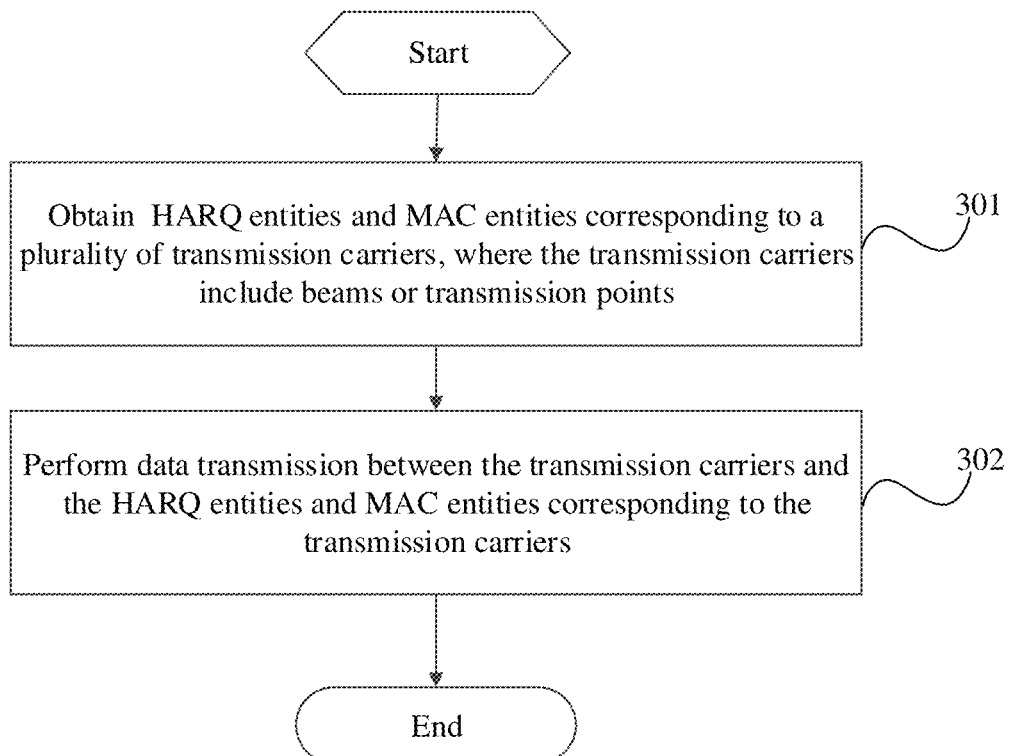
FIG. 3 is a schematic flowchart of a data transmission method according to some embodiments of this disclosure.

FIG. 3 is a schematic flowchart of a data transmission method according to some embodiments of this disclosure. As shown in FIG. 3, some embodiments of this disclosure provide a data transmission method, applied to a terminal and including the following steps.

Step 301: obtain HARQ entities and MAC entities corresponding to a plurality of transmission carriers, where the transmission carriers include beams or transmission points.

In some embodiments of this disclosure, different transmission carriers may correspond to a same MAC entity and correspond to different HARQ entities. In this case, the HARQ entities may be used to distinguish between different transmission carriers. Alternatively, different transmission carriers may correspond to a same MAC entity and correspond to a same HARQ entity. In this case, HARQ process IDs may be used to distinguish between data of different transmission carriers. Further, different transmission carriers may correspond to different MAC entities and different HARQ entities. In this case, identifier information of the MAC entities may be used to distinguish between data of different transmission carriers.

In addition, in some embodiments of this disclosure, the HARQ entities and MAC entities corresponding to the plurality of transmission carriers are obtained by the terminal or a network device based on mapping relationship information between HARQ and transmission carriers.

The mapping relationship information between HARQ and transmission carriers includes: information about a transmission carrier; and HARQ configuration information corresponding to the information about the transmission carrier.

The information about the transmission carrier includes at least one of a transmission carrier identifier, a cell identifier corresponding to the transmission carrier, a frequency identifier corresponding to the transmission carrier, a bandwidth part (BWP) identifier corresponding to the transmission carrier, a control channel identifier corresponding to the transmission carrier, or a MAC entity identifier corresponding to the transmission carrier.

Step 302: perform data transmission between the transmission carriers and the HARQ entities and MAC entities corresponding to the transmission carriers.

Step 302 includes: in a case of downlink data reception, transmitting data received by each transmission carrier to a MAC entity and a HARQ entity corresponding to the transmission carrier, for processing; and/or in a case of uplink data transmission, transmitting data to be transmitted to each transmission carrier, to a MAC entity and a HARQ entity corresponding to the transmission carrier, for processing.

The transmitting data received by each transmission carrier to a MAC entity and a HARQ entity corresponding to the transmission carrier, for processing in a case of downlink data reception includes:

in the case of downlink data reception, obtaining information about a first target transmission carrier; and determining the first target transmission carrier based on the information about the first target transmission carrier, and transmitting data received by the first target transmission carrier to a MAC entity and a HARQ entity corresponding to the first target transmission carrier, for processing.

Herein, the first target transmission carrier is any transmission carrier that performs downlink data reception, in the plurality of transmission carriers. The data received by the first target transmission carrier is identified by using the information about the first target transmission carrier. Further, the first target transmission carrier is identified based on the information about the first target transmission carrier, and the data is transmitted based on the foregoing mapping relationship information to the corresponding MAC entity and HARQ entity for processing.

For example, UE obtains information about a first target transmission carrier based on downlink data in downlink resource allocation information of downlink control information (DCI) on a physical downlink control channel (PDCCH), and transmits data to a MAC entity and a HARQ entity corresponding to the first target transmission carrier, for processing; or UE obtains information about a first target transmission carrier based on downlink data in a reference signal (for example, a synchronization signal block (SSB) and/or channel state information reference signal (CSI-RS)) information on a physical downlink shared channel (PDSCH), and transmits data to a MAC entity and a HARQ entity corresponding to the first target transmission carrier, for processing.

The transmitting data to be transmitted to each transmission carrier, to a MAC entity and a HARQ entity corresponding to the transmission carrier, for processing in a case of uplink data transmission includes:

in the case of uplink data transmission, obtaining information about a second target transmission carrier; and determining the second target transmission carrier based on the information about the second target transmission carrier, and transmitting data to be transmitted to the second target transmission carrier, to a MAC entity and a HARQ entity corresponding to the second target transmission carrier, for processing.

When the terminal performs uplink data transmission, the information about the transmission carrier may be carried, so that the network device identifies the corresponding transmission carrier based on the information about the transmission carrier.

Herein, the second target transmission carrier is any transmission carrier that performs uplink data transmission, in the plurality of transmission carriers. The data to be transmitted by the second target transmission carrier is identified by using the information about the second target transmission carrier.

For example, the UE obtains information about a second target transmission carrier based on uplink data in uplink resource allocation information of the downlink control information DCI on the physical downlink control channel PDCCH, and transmits data to a MAC entity and a HARQ entity corresponding to the second target transmission carrier, for processing; or the UE obtains information about a second target transmission carrier based on uplink data in reference signal information on the physical downlink shared channel PDSCH, and transmits data to a MAC entity and a HARQ entity corresponding to the second target transmission carrier, for processing.

In the data transmission method in some embodiments of this disclosure, the HARQ entities and MAC entities corresponding to the plurality of transmission carriers are obtained, where the transmission carriers include beams or transmission points; in the case of downlink data reception, the data received by each transmission carrier is transmitted to the MAC entity and HARQ entity corresponding to the transmission carrier, for processing; and in the case of uplink data transmission, the data to be transmitted to each transmission carrier is transmitted to the MAC entity and HARQ entity corresponding to the transmission carrier, for processing. In this way, the terminal implements data transmission and reception by using a plurality of different transmission carriers and using different HARQ processes, a scheduling delay caused by insufficiency of HARQ processes is avoided, and reliability of data transmission is improved by supporting HARQ transmission of different transmission carriers.

In some embodiments of this disclosure, the obtaining HARQ entities and MAC entities corresponding to a plurality of transmission carriers in step 301 includes:

configuring the corresponding HARQ entities and MAC entities for the plurality of transmission carriers based on mapping relationship information between HARQ and transmission carriers, where the mapping relationship information is configured by the network device or prescribed by a protocol; or obtaining HARQ entities and MAC entities configured by the network device for the plurality of transmission carriers.

In some examples, the network device configures the HARQ entities and MAC entities for the plurality of transmission carriers based on the mapping relationship information between HARQ and transmission carriers.

The mapping relationship information between HARQ and transmission carriers includes:

information about a transmission carrier; and

HARQ configuration information corresponding to the information about the transmission carrier, where the information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

For example, the cell identifier corresponding to the transmission carrier may be specifically a cell 1, the frequency identifier corresponding to the transmission carrier may be specifically a frequency 1, the BWP identifier corresponding to the transmission carrier may be specifically a BWP_1, and the MAC entity identifier corresponding to the transmission carrier may be specifically MAC_1.

The transmission carrier identifier includes at least one of a SSB identifier, a CSI-RS identifier, or a port number identifier corresponding to a reference signal, and the reference signal includes an SSB and/or a CSI-RS.

The transmission carrier identifier may also be another signal identifier, in addition to the SSB identifier and/or the CSI-RS identifier. This is not specifically limited herein.

The port number identifier corresponding to the reference signal may be specifically a port_1, and the reference signal may also be another reference signal, in addition to the SSB and the CSI-RS. This is not specifically limited herein.

The control channel identifier corresponding to the transmission carrier includes at least one of a control channel type identifier, a resource position identifier of a control channel, a reference signal identifier of a control channel, or a port number identifier corresponding to a reference signal of a control channel.

The control channel type identifier may be specifically a PDCCH_1 of a primary cell PCell; the resource position identifier of the control channel may be a control resource set (CORESET) and/or a search space identifier; and the reference signal identifier of the control channel may be an SSB identifier and/or a CSI-RS identifier.

In a first optional implementation, the configuring the corresponding HARQ entities and MAC entities for the plurality of transmission carriers includes:

configuring different HARQ entities for different transmission carriers.

Optionally, the different HARQ entities configured above belong to a same MAC entity.

In this implementation, the HARQ configuration information corresponding to the information about the transmission carrier includes a quantity of HARQ processes, for example, a quantity of HARQ processes corresponding to uplink data transmission and/or downlink data reception.

Figure 4:
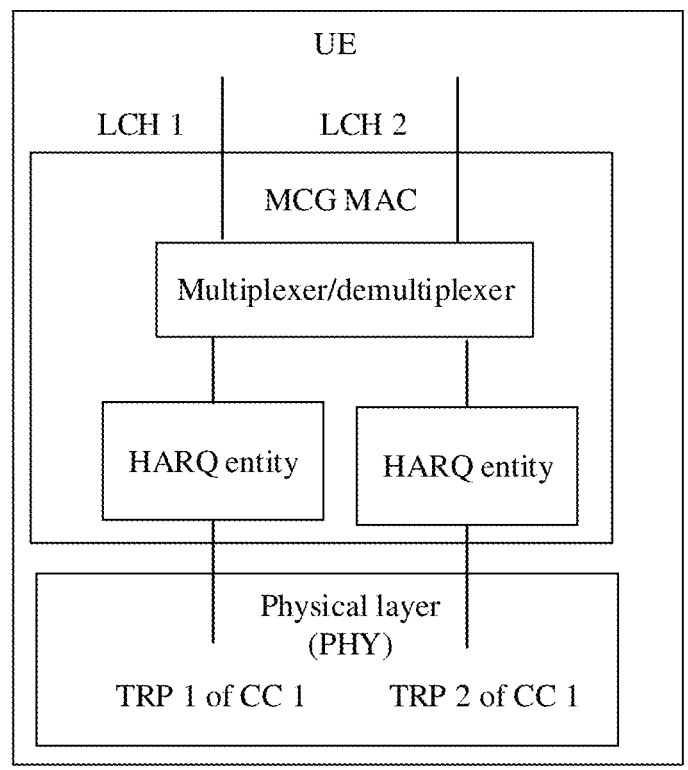
FIG. 4 is a first schematic diagram of a transmission carrier and a corresponding MAC entity and HARQ entity according to some embodiments of this disclosure.

As shown in FIG. 4, a transmission carrier 1 of a component carrier 1 (TRP 1 of CC 1) and a transmission carrier 2 of the component carrier 1 (TRP 2 of CC 1) correspond to a same MAC entity (MCG MAC) and correspond to different HARQ entities.

In a second optional implementation, the configuring the corresponding HARQ entities and MAC entities for the plurality of transmission carriers includes:

configuring a same HARQ entity for the plurality of transmission carriers, and configuring different HARQ process IDs for different transmission carriers.

In this implementation, the HARQ configuration information corresponding to the information about the transmission carrier includes at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

Optionally, the HARQ configuration information corresponding to the information about the transmission carrier includes at least one of first information or second information, where the first information includes the HARQ process ID available to the transmission carrier; and the second information includes the total quantity of available HARQ processes of the HARQ entity corresponding to the transmission carrier and the quantity of HARQ processes available to the transmission carrier.

For example, HARQ process IDs available to the transmission carriers are: HARQ process IDs [0, 3] available to a beam 1; and HARQ process IDs [1, 7] available to a beam 2. Alternatively, a bitmap is used to identify HARQ process IDs available to the beam or the transmission point; and the quantity of HARQ processes available to the transmission carrier is a quantity of HARQ processes corresponding to uplink data transmission and/or downlink data reception.

Figure 5:
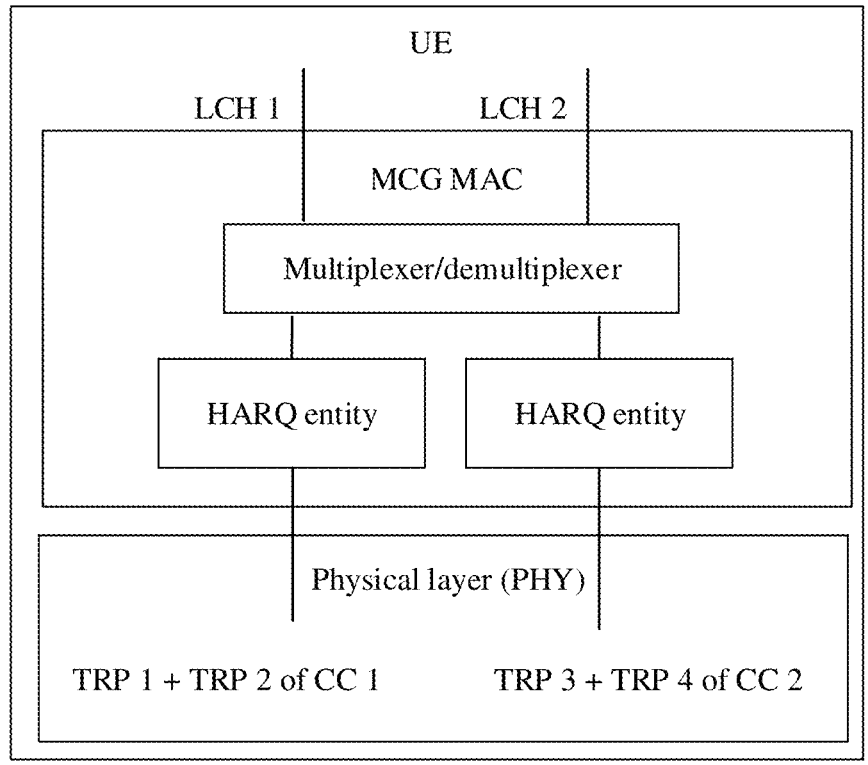
FIG. 5 is a second schematic diagram of a transmission carrier and a corresponding MAC entity and HARQ entity according to some embodiments of this disclosure.

As shown in FIG. 5, a transmission carrier 1 and a transmission carrier 2 of a component carrier 1 (TRP 1+TRP 2 of CC 1) correspond to a same MAC entity (MCG MAC) and correspond to a same HARQ entity; and a transmission carrier 3 and a transmission carrier 4 of a component carrier 2 (TRP 3+TRP 4 of CC 2) correspond to a same MAC entity (MCG MAC) and correspond to a same HARQ entity.

In a third optional implementation, the configuring the corresponding HARQ entities and MAC entities for the plurality of transmission carriers includes:

configuring different HARQ entities for different transmission carriers, and configuring different MAC entities for different transmission carriers.

In this implementation, the mapping relationship information between HARQ and transmission carriers further includes MAC configuration information corresponding to the transmission carrier, and the HARQ configuration information corresponding to the information about the transmission carrier includes a quantity of HARQ processes.

Figure 6:
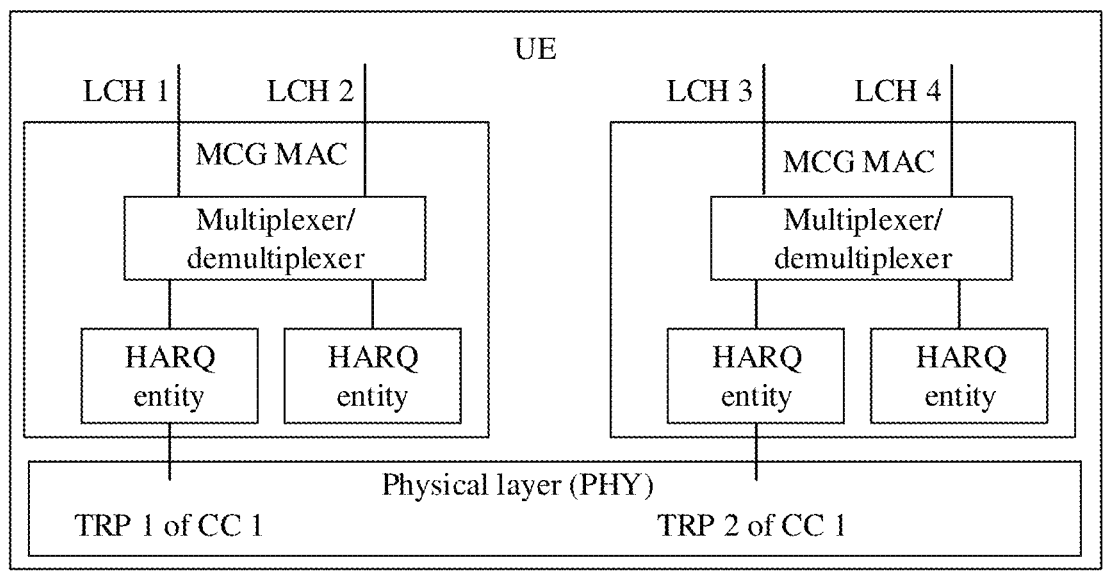
FIG. 6 is a third schematic diagram of a transmission carrier and a corresponding MAC entity and HARQ entity according to some embodiments of this disclosure.

As shown in FIG. 6, a transmission carrier 1 of a component carrier 1 (TRP 1 of CC 1) corresponds to one MAC entity; and a transmission carrier 2 of the component carrier 1 (TRP 2 of CC 1) corresponds to another MAC entity, and the transmission carrier 1 and transmission carrier 2 of the component carrier 1 correspond to different HARQ entities.

The MAC configuration information corresponding to the transmission carrier includes at least one of the following:

identifier information of a MAC entity;

one or more logical channel identifiers (for example, an LCH_1) corresponding to the MAC entity;

one or more data radio bearer (DRB) identifiers (for example, a DRB_1) corresponding to identifier information of a MAC entity;

one or more data flow identifiers corresponding to identifier information of the MAC entity; or one or more session identifiers (for example, a Session_1) corresponding to identifier information of the MAC entity.

Optionally, the MAC configuration information corresponding to the transmission carrier includes identifier information of a MAC entity.

In the data transmission method in some embodiments of this disclosure, the terminal can implement data transmission and reception by using a plurality of different transmission carriers and using different HARQ processes, a scheduling delay caused by insufficiency of HARQ processes is avoided, and reliability of data transmission is improved by supporting HARQ transmission of different transmission carriers.

As shown in FIG. 3, some embodiments of this disclosure further provide a data transmission method, applied to a network device and including the following steps.

Step 301: Obtain HARQ entities and MAC entities corresponding to a plurality of transmission carriers, where the transmission carriers include beams or transmission points.

In some embodiments of this disclosure, different transmission carriers may correspond to a same MAC entity and correspond to different HARQ entities. In this case, the HARQ entities may be used to distinguish between different transmission carriers. Alternatively, different transmission carriers may correspond to a same MAC entity and correspond to a same HARQ entity. In this case, HARQ process IDs may be used to distinguish between data of different transmission carriers. Further, different transmission carriers may correspond to different MAC entities and different HARQ entities. In this case, identifier information of the MAC entities may be used to distinguish between data of different transmission carriers.

In addition, in some embodiments of this disclosure, the HARQ entities and MAC entities corresponding to the plurality of transmission carriers are obtained by a terminal or the network device based on mapping relationship information between HARQ and transmission carriers.

The mapping relationship information between HARQ and transmission carriers includes: information about a transmission carrier; and HARQ configuration information corresponding to the information about the transmission carrier.

The information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

Step 302: perform data transmission between the transmission carriers and the HARQ entities and MAC entities corresponding to the transmission carriers.

Step 302 may include: in a case of downlink data transmission, transmitting data to be transmitted to each transmission carrier, to a MAC entity and a HARQ entity corresponding to the transmission carrier, for processing; and/or
  in a case of uplink data reception, transmitting data received by each transmission carrier to a MAC entity and a HARQ entity corresponding to the transmission carrier, for processing.

The transmitting data to be transmitted to each transmission carrier, to a MAC entity and a HARQ entity corresponding to the transmission carrier, for processing in a case of downlink data transmission includes:

In some examples, in the case of downlink data transmission, obtaining information about a third target transmission carrier; and determining the third target transmission carrier based on the information about the third target transmission carrier, and transmitting data to be transmitted to the third target transmission carrier, to a MAC entity and a HARQ entity corresponding to the third target transmission carrier, for processing.

Herein, the third target transmission carrier is any transmission carrier that performs downlink data transmission, in the plurality of transmission carriers. The data to be transmitted by the third target transmission carrier is identified by using the information about the third target transmission carrier.

When the network device performs downlink data transmission, the information about the transmission carrier may be carried, so that the terminal identifies the corresponding transmission carrier based on the information about the transmission carrier.

The transmitting data received by each transmission carrier to a MAC entity and a HARQ entity corresponding to the transmission carrier, for processing in a case of uplink data reception includes:
  in the case of uplink data reception, obtaining information about a fourth target transmission carrier; and determining the fourth target transmission carrier based on the information about the fourth target transmission carrier, and transmitting data received by the fourth target transmission carrier to a MAC entity and a HARQ entity corresponding to the fourth target transmission carrier, for processing.

Herein, the fourth target transmission carrier is any transmission carrier that performs uplink data reception, in the plurality of transmission carriers. The data received by the fourth target transmission carrier is identified by using the information about the fourth target transmission carrier. Further, the fourth target transmission carrier is identified based on the information about the fourth target transmission carrier, and the data is transmitted based on the foregoing mapping relationship information to the corresponding MAC entity and HARQ entity for processing.

In the data transmission method in some embodiment of this disclosure, the HARQ entities and MAC entities corresponding to the plurality of transmission carriers are obtained, where the transmission carriers include beams or transmission points; in the case of downlink data transmission, the data to be transmitted to each transmission carrier is transmitted to the MAC entity and HARQ entity corresponding to the transmission carrier, for processing; and in the case of uplink data reception, the data received by each transmission carrier is transmitted to the MAC entity and HARQ entity corresponding to the transmission carrier, for processing. In this way, data transmission and reception are implemented by using a plurality of different transmission carriers and using different HARQ processes, a scheduling delay caused by insufficiency of HARQ processes is avoided, and reliability of data transmission is improved by supporting HARQ transmission of different transmission carriers.

In some embodiment of this disclosure, the obtaining HARQ entities and MAC entities corresponding to a plurality of transmission carriers in step 301 includes:
  configuring the corresponding HARQ entities and MAC entities for the plurality of transmission carriers based on mapping relationship information between HARQ and transmission carriers, where the mapping relationship information is configured by the network device or prescribed by a protocol; or
  obtaining HARQ entities and MAC entities configured by the terminal for the plurality of transmission carriers.

In some examples, the terminal configures the HARQ entities and MAC entities for the plurality of transmission carriers based on the mapping relationship information between HARQ and transmission carriers.

The mapping relationship information between HARQ and transmission carriers includes:
  information about a transmission carrier; and
  HARQ configuration information corresponding to the information about the transmission carrier, where
  the information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

For example, the cell identifier corresponding to the transmission carrier may be specifically a cell 1, the frequency identifier corresponding to the transmission carrier may be specifically a frequency 1, the BWP identifier corresponding to the transmission carrier may be specifically a BWP_1, and the MAC entity identifier corresponding to the transmission carrier may be specifically MAC_1.

The transmission carrier identifier includes at least one of a SSB identifier, a CSI-RS identifier, or a port number identifier corresponding to a reference signal, and the reference signal includes an SSB and/or a CSI-RS.

The transmission carrier identifier may also be another signal identifier, in addition to the SSB identifier and/or the CSI-RS identifier. This is not specifically limited herein.

The port number identifier corresponding to the reference signal may be specifically a port_1, and the reference signal may also be another reference signal, in addition to the SSB and the CSI-RS. This is not specifically limited herein.

The control channel identifier corresponding to the transmission carrier includes at least one of a control channel type identifier, a resource position identifier of a control channel, a reference signal identifier of a control channel, or a port number identifier corresponding to a reference signal of a control channel.

The control channel type identifier may be specifically a PDCCH_1 of a primary cell PCell; the resource position identifier of the control channel may be a control resource set (CORESET) and/or a search space identifier; and the reference signal identifier of the control channel may be an SSB identifier and/or a CSI-RS identifier.

In a first optional implementation, the configuring the corresponding HARQ entities and MAC entities for the plurality of transmission carriers includes:
configuring different HARQ entities for different transmission carriers.

Optionally, the different HARQ entities configured above belong to a same MAC entity.

In this implementation, the HARQ configuration information corresponding to the information about the transmission carrier includes a quantity of HARQ processes, for example, a quantity of HARQ processes corresponding to uplink data reception and/or downlink data transmission.

In a second optional implementation,
the configuring the corresponding HARQ entities and MAC entities for the plurality of transmission carriers includes:
configuring a same HARQ entity for the plurality of transmission carriers, and configuring different HARQ process IDs for different transmission carriers.

In this implementation, the HARQ configuration information corresponding to the information about the transmission carrier includes at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

Optionally, the HARQ configuration information corresponding to the information about the transmission carrier includes at least one of first information or second information, where the first information includes the HARQ process ID available to the transmission carrier; and the second information includes the total quantity of available HARQ processes of the HARQ entity corresponding to the transmission carrier and the quantity of HARQ processes available to the transmission carrier.

For example, HARQ process IDs available to the transmission carriers are: HARQ process IDs [0, 3] available to a beam 1; and HARQ process IDs [1, 7] available to a beam 2. Alternatively, a bitmap is used to identify HARQ process IDs available to the beam or the transmission point; and the quantity of HARQ processes available to the transmission carrier is a quantity of HARQ processes corresponding to uplink data transmission and/or downlink data reception.

In a third optional implementation, the configuring the corresponding HARQ entities and MAC entities for the plurality of transmission carriers includes:
configuring different HARQ entities for different transmission carriers, and configuring different MAC entities for different transmission carriers.

In this implementation, the mapping relationship information between HARQ and transmission carriers further includes MAC configuration information corresponding to the transmission carrier, and the HARQ configuration information corresponding to the information about the transmission carrier includes a quantity of HARQ processes.

The MAC configuration information corresponding to the transmission carrier includes at least one of the following:
identifier information of a MAC entity;
one or more logical channel identifiers (for example, an LCH_1) corresponding to the MAC entity;
one or more DRB identifiers (for example, a DRB_1) corresponding to identifier information of a MAC entity;
one or more data flow identifiers corresponding to identifier information of the MAC entity; or
one or more session identifiers (for example, a Session_1) corresponding to identifier information of the MAC entity.

Optionally, the MAC configuration information corresponding to the transmission carrier includes identifier information of a MAC entity.

In the data transmission method in some embodiments of this disclosure, terminal can implement data transmission and reception by using a plurality of different transmission carriers and using different HARQ processes, a scheduling delay caused by insufficiency of HARQ processes is avoided, and reliability of data transmission is improved by supporting HARQ transmission of different transmission carriers.

Figure 7:
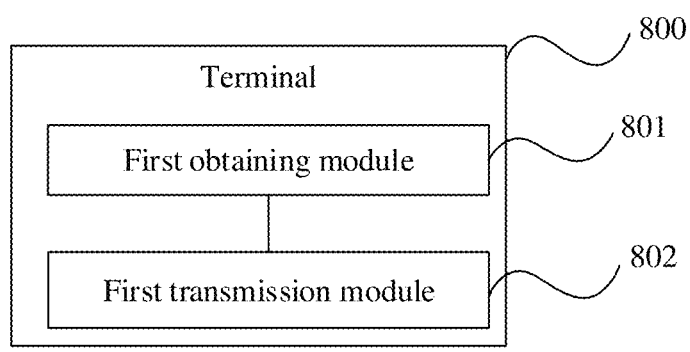
FIG. 7 is a schematic modular diagram of a terminal according to some embodiments of this disclosure.

FIG. 7 is a schematic modular diagram of a terminal according to some embodiments of this disclosure. As shown in FIG. 7, some embodiments of this disclosure further provides a terminal 800, including:
a first obtaining module 801, configured to obtain HARQ entities and MAC entities corresponding to a plurality of transmission carriers, where the transmission carriers include beams or transmission points; and
a first transmission module 802, configured to perform data transmission between the transmission carriers and the HARQ entities and MAC entities corresponding to the transmission carriers.

In the terminal in this embodiment of this disclosure, the first transmission module is configured to: in a case of downlink data reception, transmit data received by each transmission carrier to a MAC entity and a HARQ entity corresponding to the transmission carrier, for processing; and/or
in a case of uplink data transmission, transmit data to be transmitted to each transmission carrier, to a MAC entity and a HARQ entity corresponding to the transmission carrier, for processing.

In the terminal in this embodiment of this disclosure, the first obtaining module is configured to: configure the corresponding HARQ entities and MAC entities for the plurality of transmission carriers based on mapping relationship information between HARQ and transmission carriers, where the mapping relationship information is configured by a network device or prescribed by a protocol; or obtain HARQ entities and MAC entities configured by a network device for the plurality of transmission carriers.

In the terminal in this embodiment of this disclosure, the mapping relationship information between HARQ and transmission carriers includes:

information about a transmission carrier; and

HARQ configuration information corresponding to the information about the transmission carrier, where the information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

In the terminal in this embodiment of this disclosure, the first obtaining module is configured to configure different HARQ entities for different transmission carriers.

In the terminal in this embodiment of this disclosure, the HARQ configuration information corresponding to the information about the transmission carrier includes a quantity of HARQ processes.

In the terminal in this embodiment of this disclosure, the first obtaining module is configured to configure a same HARQ entity for the plurality of transmission carriers, and configure different HARQ process IDs for different transmission carriers.

In the terminal in this embodiment of this disclosure, the HARQ configuration information corresponding to the information about the transmission carrier includes at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

In the terminal in this embodiment of this disclosure, the first obtaining module is configured to configure different HARQ entities for different transmission carriers, and configure different MAC entities for different transmission carriers.

In the terminal in this embodiment of this disclosure, the mapping relationship information between HARQ and transmission carriers further includes MAC configuration information corresponding to the transmission carrier, and the HARQ configuration information corresponding to the information about the transmission carrier includes a quantity of HARQ processes.

In the terminal in this embodiment of this disclosure, the MAC configuration information corresponding to the transmission carrier includes at least one of the following:

identifier information of a MAC entity;

one or more logical channel identifiers corresponding to identifier information of a MAC entity;

one or more DRB identifiers corresponding to identifier information of a MAC entity;

one or more data flow identifiers corresponding to identifier information of a MAC entity; or one or more session identifiers corresponding to identifier information of a MAC entity.

In the terminal in this embodiment of this disclosure, the transmission carrier identifier includes at least one of a SSB identifier, a CSI-RS identifier, or a port number identifier corresponding to a reference signal, and the reference signal includes an SSB and/or a CSI-RS.

In the terminal in this embodiment of this disclosure, the control channel identifier corresponding to the transmission carrier includes at least one of a control channel type identifier, a resource position identifier of a control channel, a reference signal identifier of a control channel, or a port number identifier corresponding to a reference signal of a control channel.

In the terminal in this embodiment of this disclosure, the first transmission module is configured to: in the case of downlink data reception, obtain information about a first target transmission carrier; and determine the first target transmission carrier based on the information about the first target transmission carrier, and transmit data received by the first target transmission carrier to a MAC entity and a HARQ entity corresponding to the first target transmission carrier, for processing; and/or in the case of uplink data transmission, obtain information about a second target transmission carrier; and determine the second target transmission carrier based on the information about the second target transmission carrier, and transmit data to be transmitted to the second target transmission carrier, to a MAC entity and a HARQ entity corresponding to the second target transmission carrier, for processing.

Some embodiments of this disclosure further provide a terminal, including a memory, a processor, and a computer program stored in the memory and capable of running on the processor. When the computer program is executed by the processor, each process of the foregoing data transmission method embodiment applied to the terminal is implemented, with the same technical effect achieved. To avoid repetition, details are not described again herein.

Some embodiments of this disclosure further provide a non-transitory computer-readable storage medium, where the non-transitory computer-readable storage medium stores a computer program. When the computer program is executed by a processor, each process of the foregoing data transmission method embodiment applied to the terminal is implemented, with the same technical effect achieved. To avoid repetition, details are not described again herein. The non-transitory computer-readable storage medium is, for example, a read-only memory (Read-Only Memory, ROM for short), a random access memory (Random Access Memory, RAM for short), a magnetic disk, or an optical disc.

Figure 8:
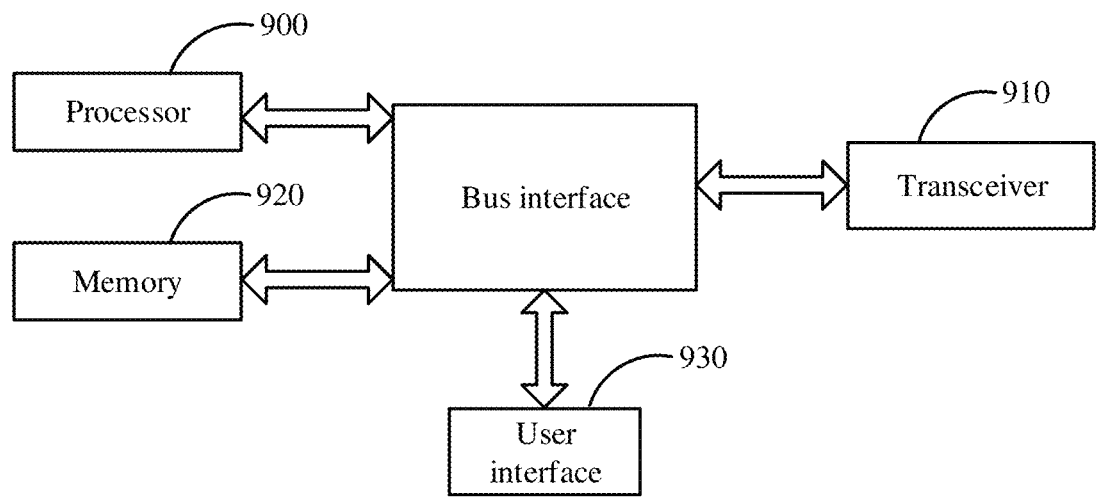
FIG. 8 is a first structural block diagram of a terminal according to some embodiments of this disclosure.

To better achieve the foregoing objective, as shown in FIG. 8, some embodiments of this disclosure further provides a terminal, including a memory 920, a processor 900, a transceiver 910, a user interface 930, a bus interface, and a computer program stored in the memory 920 and capable of running on the processor 900, where the processor 900 is configured to read the program in the memory 920 to perform the following process:

obtaining HARQ entities and MAC entities corresponding to a plurality of transmission carriers, where the transmission carriers include beams or transmission points; and performing data transmission between the transmission carriers and the HARQ entities and MAC entities corresponding to the transmission carriers.

In FIG. 8, a bus architecture may include any quantity of interconnect buses and bridges, for interconnecting various circuits of one or more processors represented by the processor 900 and a memory represented by the memory 920. The bus architecture may further interconnect various other circuits such as a peripheral device, a voltage regulator, and a power management circuit. These are all well known in the art, and therefore are not further described in this specification. The bus interface provides an interface. The transceiver 910 may be a plurality of components, that is, the transceiver 910 includes a transmitter and a receiver, and provides a unit for communicating with various other apparatuses on a transmission medium. For different user equipment, the user interface 930 may also be an interface for externally or internally connecting a required device, and the connected device includes but is not limited to a mini keyboard, a display, a speaker, a microphone, a joystick, or the like.

The processor 900 is responsible for bus architecture management and general processing. The memory 920 may store data used when the processor 900 performs an operation.

Optionally, by reading the program in the memory 920, the processor 900 is further configured to perform the following:
  configuring the corresponding HARQ entities and MAC entities for the plurality of transmission carriers based on mapping relationship information between HARQ and transmission carriers; or
  obtaining HARQ entities and MAC entities configured by a network device for the plurality of transmission carriers.

Optionally, the mapping relationship information between HARQ and transmission carriers includes:
  information about a transmission carrier; and
  HARQ configuration information corresponding to the information about the transmission carrier, where
  the information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

Optionally, by reading the program in the memory 920, the processor 900 is further configured to perform the following:
  configuring different HARQ entities for different transmission carriers.

Optionally, the HARQ configuration information corresponding to the information about the transmission carrier includes a quantity of HARQ processes.

Optionally, by reading the program in the memory 920, the processor 900 is further configured to perform the following:
  configuring a same HARQ entity for the plurality of transmission carriers, and configuring different HARQ process IDs for different transmission carriers.

Optionally, the HARQ configuration information corresponding to the information about the transmission carrier includes at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

Optionally, by reading the program in the memory 920, the processor 900 is further configured to perform the following:
  configuring different HARQ entities for different transmission carriers, and configuring different MAC entities for different transmission carriers.

Optionally, the mapping relationship information between HARQ and transmission carriers further includes MAC configuration information corresponding to the transmission carrier, and the HARQ configuration information corresponding to the information about the transmission carrier includes a quantity of HARQ processes.

Optionally, the MAC configuration information corresponding to the transmission carrier includes at least one of the following:
  identifier information of a MAC entity;
  one or more logical channel identifiers corresponding to identifier information of a MAC entity;
  one or more DRB identifiers corresponding to identifier information of a MAC entity;
  one or more data flow identifiers corresponding to identifier information of a MAC entity; or
  one or more session identifiers corresponding to identifier information of a MAC entity.

Optionally, the transmission carrier identifier includes at least one of a SSB identifier, a CSI-RS identifier, or a port number identifier corresponding to a reference signal, and the reference signal includes an SSB and/or a CSI-RS.

Optionally, the control channel identifier corresponding to the transmission carrier includes at least one of a control channel type identifier, a resource position identifier of a control channel, a reference signal identifier of a control channel, or a port number identifier corresponding to a reference signal of a control channel.

Optionally, by reading the program in the memory 920, the processor 900 is further configured to perform the following:
  in a case of downlink data reception, transmitting data received by each transmission carrier to a MAC entity and a HARQ entity corresponding to the transmission carrier, for processing; and/or
  in a case of uplink data transmission, transmitting data to be transmitted to each transmission carrier, to a MAC entity and a HARQ entity corresponding to the transmission carrier, for processing.

Optionally, by reading the program in the memory 920, the processor 900 is further configured to perform the following:
  in the case of downlink data reception, obtaining information about a first target transmission carrier; and
  determining the first target transmission carrier based on the information about the first target transmission carrier, and transmitting data received by the first target transmission carrier to a MAC entity and a HARQ entity corresponding to the first target transmission carrier, for processing; and Optionally, by reading the program in the memory 920, the processor 900 is further configured to perform the following:
  in the case of uplink data transmission, obtaining information about a second target transmission carrier; and
  determining the second target transmission carrier based on the information about the second target transmission carrier, and transmitting data to be transmitted to the second target transmission carrier, to a MAC entity and a HARQ entity corresponding to the second target transmission carrier, for processing.

Figure 9:
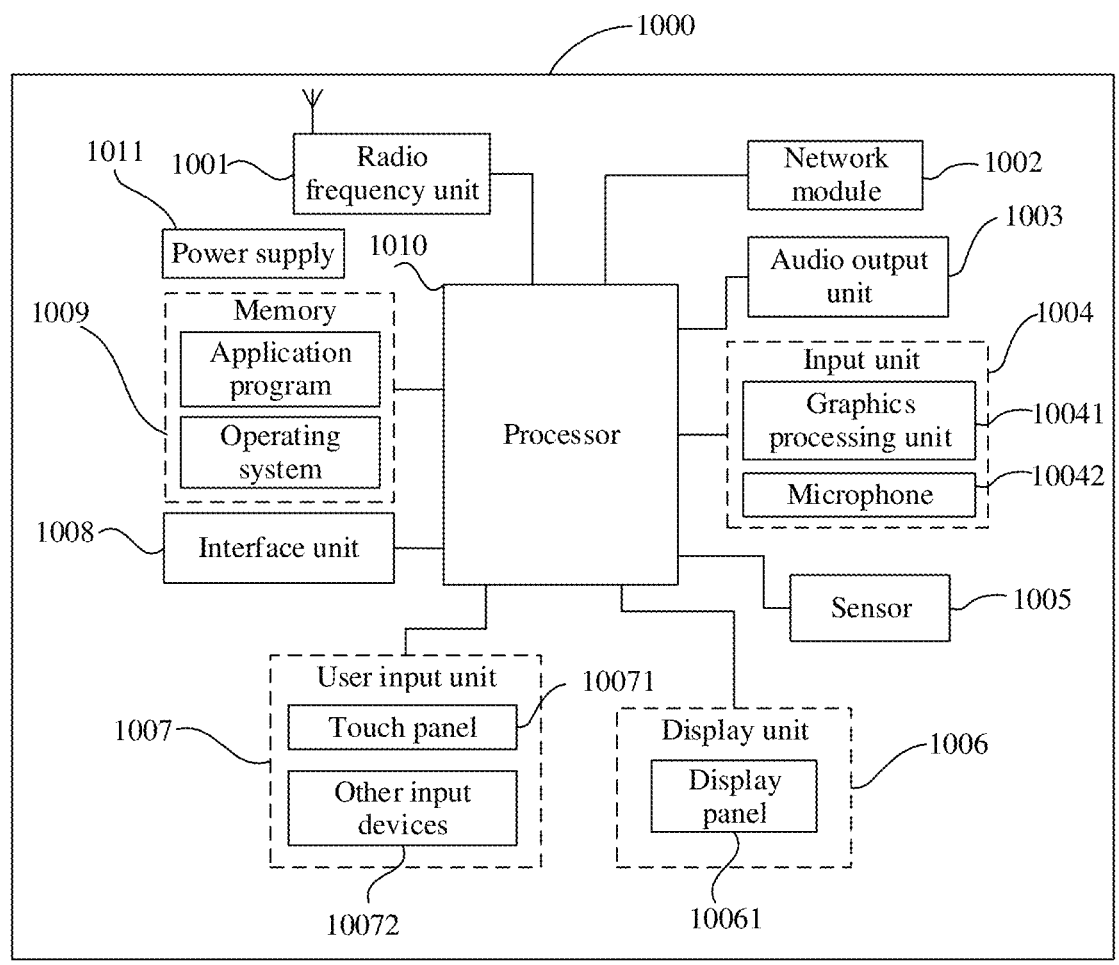
FIG. 9 is a second structural block diagram of a terminal according to some embodiments of this disclosure.

FIG. 9 is a schematic diagram of a hardware structure of a terminal for implementing each embodiment of this disclosure. The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the structure of the terminal shown in FIG. 9 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 1010 is configured to: obtain HARQ entities and MAC entities corresponding to a plurality of transmission carriers, where the transmission carriers include beams or transmission points; and the radio frequency unit 1001 is configured to: perform data transmission between the transmission carriers and the HARQ entities and MAC entities corresponding to the transmission carriers.

In the foregoing technical solution in this embodiment of this disclosure, the HARQ entities and MAC entities corresponding to the plurality of transmission carriers are obtained, where the transmission carriers include beams or transmission points; in the case of downlink data reception, the data received by each transmission carrier is transmitted to the MAC entity and HARQ entity corresponding to the transmission carrier, for processing; and in the case of uplink data transmission, the data to be transmitted to each transmission carrier is transmitted to the MAC entity and HARQ entity corresponding to the transmission carrier, for processing. In this way, the terminal implements data transmission and reception by using a plurality of different transmission carriers and using different HARQ processes, a scheduling delay caused by insufficiency of HARQ processes is avoided, and reliability of data transmission is improved by supporting HARQ transmission of different transmission carriers.

It should be understood that in some embodiments of this disclosure, the radio frequency unit 1001 may be configured to receive and send signals in an information reception or transmission or call process. After receiving downlink data from a network device, the radio frequency unit 1001 sends the downlink data to the processor 1010 for processing, and in addition, sends uplink data to the network device. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device through a wireless communications system.

The terminal provides wireless broadband Internet access for a user by using the network module 1002, for example, helps the user send and receive e-mails, browse web pages, and access streaming media.

The audio output unit 1003 may convert audio data received by the radio frequency unit 1001 or the network module 1002 or stored in the memory 1009 into an audio signal, and output the audio signal as a sound. In addition, the audio output unit 1003 may further provide an audio output (for example, a call signal reception sound or a message reception sound) related to a specific function performed by the terminal 1000. The audio output unit 1003 includes a speaker, a buzzer, a telephone receiver, and the like.

The input unit 1004 is configured to receive an audio or video signal. The input unit 1004 may include a graphics processing unit (Graphics Processing Unit, GPU) 10041 and a microphone 10042. The graphics processing unit 10041 processes image data of a still picture or a video obtained by an image capture apparatus (for example, a camera) in an image capture mode or a video capture mode. A processed image frame may be displayed on the display unit 1006. An image frame processed by the graphics processing unit 10041 may be stored in the memory 1009 (or another storage medium) or sent by the radio frequency unit 1001 or the network module 1002. The microphone 10042 can receive a sound and can process the sound into audio data. The processed audio data may be converted in a telephone call mode into a format that can be sent to a mobile communications network device through the radio frequency unit 1001, for outputting.

The terminal 1000 further includes at least one sensor 1005, for example, an optical sensor, a motion sensor, and another sensor. The optical sensor includes an ambient light sensor and a proximity sensor. The ambient light sensor may adjust luminance of a display panel 10061 based on brightness of ambient light. The proximity sensor may turn off the display panel 10061 and/or backlight when the terminal 1000 moves to an ear. As a type of motion sensor, an accelerometer sensor can detect magnitudes of acceleration in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided for the user. The display unit 1006 may include the display panel 10061. The display panel 10061 may be configured in a form of a liquid crystal display (LCD), an organic light-emitting diode (OLED), or the like.

The user input unit 1007 may be configured to receive input digit or character information, and generate a key signal input related to a user setting and function control of the terminal. The user input unit 1007 includes a touch panel 10071 and other input devices 10072. The touch panel 10071, also referred to as a touchscreen, may capture a touch operation performed by the user on or near the touch panel (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 1010, and receives and executes a command sent by the processor 1010. In addition, the touch panel 10071 may be implemented in a plurality of forms, for example, a resistive, capacitive, infrared, or surface acoustic wave touch panel. The user input unit 1007 may further include the other input devices 10072 in addition to the touch panel 10071. The other input devices 10072 may include but are not limited to a physical keyboard, a function key (such as a volume control key or a power on/off key), a trackball, a mouse, a joystick, and the like. Details are not described herein.

The touch panel 10071 may cover the display panel 10061. After the touch panel 10071 detects a touch operation on or near the touch panel, the touch panel 10071 transmits the touch operation to the processor 1010 to determine a type of a touch event. Then the processor 1010 provides a corresponding visual output on the display panel 10061 based on the type of the touch event. Although the touch panel 10071 and the display panel 10061 are used as two independent components to implement input and output functions of the terminal in FIG. 9, the touch panel 10071 and the display panel 10061 may be integrated to implement the input and output functions of the terminal in some embodiments. This is not specifically limited herein.

The interface unit 1008 is an interface for connecting an external apparatus to the terminal 1000. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 1008 may be configured to receive an input (for example, data information or power) from an external apparatus, and transmit the received input to one or more components in the terminal 1000, or may be configured to transmit data between the terminal 1000 and an external apparatus.

The memory 1009 may be configured to store software programs and various data. The memory 1009 may primarily include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1009 may include a high-speed random access memory, or may further include a non-volatile memory, for example, at least one magnetic disk storage device, a flash memory, or may include another volatile solid-state storage device.

The processor 1010 is a control center of the terminal. The processor 1010 uses various interfaces and lines to connect all parts of the entire terminal, and performs various functions and data processing of the terminal by running or executing the software program and/or module stored in the memory 1009 and invoking data stored in the memory 1009, thereby performing overall monitoring on the terminal. The processor 1010 may include one or more processing units. Optionally, the processor 1010 may integrate an application processor and a modem processor. The application processor mainly processes the operating system, a user interface, an application program, and the like. The modem processor mainly processes wireless communication. It may be understood that the modem processor may alternatively not be integrated into the processor 1010.

The terminal 1000 may further include the power supply 1011 (for example, a battery) supplying power to all components. Optionally, the power supply 1011 may be logically connected to the processor 1010 through a power management system. In this way, functions such as charge management, discharge management, and power consumption management are implemented by using the power management system.

In addition, the terminal 1000 includes some functional modules that are not illustrated. Details are not described herein.

Figure 10:
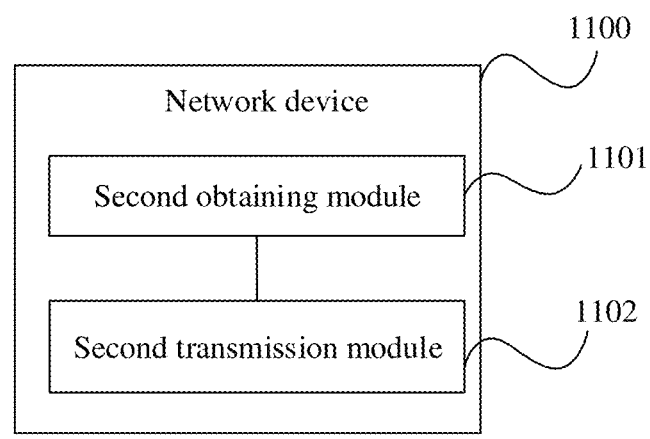
FIG. 10 is a schematic modular diagram of a network device according to some embodiments of this disclosure.

As shown in FIG. 10, some embodiments of this disclosure further provide a network device 1100, including:
- a second obtaining module 1101, configured to obtain HARQ entities and MAC entities corresponding to a plurality of transmission carriers, where the transmission carriers include beams or transmission points; and
- a second transmission module 1102, configured to perform data transmission between the transmission carriers and the HARQ entities and MAC entities corresponding to the transmission carriers.

In the network device in this embodiment of this disclosure, the second obtaining module is configured to: configure the corresponding HARQ entities and MAC entities for the plurality of transmission carriers based on mapping relationship information between HARQ and transmission carriers; or obtain HARQ entities and MAC entities configured by a terminal for the plurality of transmission carriers.

In the network device in this embodiment of this disclosure, the mapping relationship information between HARQ and transmission carriers includes:
- information about a transmission carrier; and
- HARQ configuration information corresponding to the information about the transmission carrier, where
- the information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

In the network device in this embodiment of this disclosure, the second obtaining module is configured to configure different HARQ entities for different transmission carriers.

In the network device in this embodiment of this disclosure, the HARQ configuration information corresponding to the information about the transmission carrier includes a quantity of HARQ processes.

In the network device in this embodiment of this disclosure, the second obtaining module is configured to configure a same HARQ entity for the plurality of transmission carriers, and configure different HARQ process IDs for different transmission carriers.

In the network device in this embodiment of this disclosure, the HARQ configuration information corresponding to the information about the transmission carrier includes at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

In the network device in this embodiment of this disclosure, the second obtaining module is configured to configure different HARQ entities for different transmission carriers, and configure different MAC entities for different transmission carriers.

The mapping relationship information between HARQ and transmission carriers further includes MAC configuration information corresponding to the transmission carrier, and the HARQ configuration information corresponding to the information about the transmission carrier includes a quantity of HARQ processes.

In the network device in this embodiment of this disclosure, the MAC configuration information corresponding to the transmission carrier includes at least one of the following:

identifier information of a MAC entity;
one or more logical channel identifiers corresponding to identifier information of a MAC entity;
one or more DRB identifiers corresponding to identifier information of a MAC entity;
one or more data flow identifiers corresponding to identifier information of a MAC entity; or
one or more session identifiers corresponding to identifier information of a MAC entity.

In the network device in this embodiment of this disclosure, the transmission carrier identifier includes at least one of a SSB identifier, a CSI-RS identifier, or a port number identifier corresponding to a reference signal, and the reference signal includes an SSB and/or a CSI-RS.

In the network device in this embodiment of this disclosure, the control channel identifier corresponding to the transmission carrier includes at least one of a control channel type identifier, a resource position identifier of a control channel, a reference signal identifier of a control channel, or a port number identifier corresponding to a reference signal of a control channel.

In the network device in this embodiment of this disclosure, the second transmission module is configured to: in a case of downlink data transmission, transmit data to be transmitted to each transmission carrier, to a MAC entity and a HARQ entity corresponding to the transmission carrier, for processing; and/or in a case of uplink data reception, transmit data received by each transmission carrier to a MAC entity and a HARQ entity corresponding to the transmission carrier, for processing.

In the network device in this embodiment of this disclosure, the second transmission module is configured to: in the case of downlink data transmission, obtain information about a third target transmission carrier; and determine the third target transmission carrier based on the information about the third target transmission carrier, and transmit data to be transmitted to the third target transmission carrier, to a MAC entity and a HARQ entity corresponding to the third target transmission carrier, for processing; and/or in the case of uplink data reception, obtain information about a fourth target transmission carrier; and determine the fourth target transmission carrier based on the information about the fourth target transmission carrier, and transmit data received by the fourth target transmission carrier to a MAC entity and a HARQ entity corresponding to the fourth target transmission carrier, for processing.

Some embodiments of this disclosure further provide a network device, including a memory, a processor, and a computer program stored in the memory and capable of running on the processor. When the computer program is executed by the processor, each process of the foregoing data transmission method embodiment applied to the network device is implemented, with the same technical effect achieved. To avoid repetition, details are not described again herein.

Some embodiments of this disclosure further provide a non-transitory computer-readable storage medium, where the non-transitory computer-readable storage medium stores a computer program. When the computer program is executed by a processor, each process of the foregoing data transmission method embodiment applied to the network device is implemented, with the same technical effect achieved. To avoid repetition, details are not described again herein. The non-transitory computer-readable storage medium is, for example, a ROM, a RAM, a magnetic disk, or an optical disc.

Figure 11:
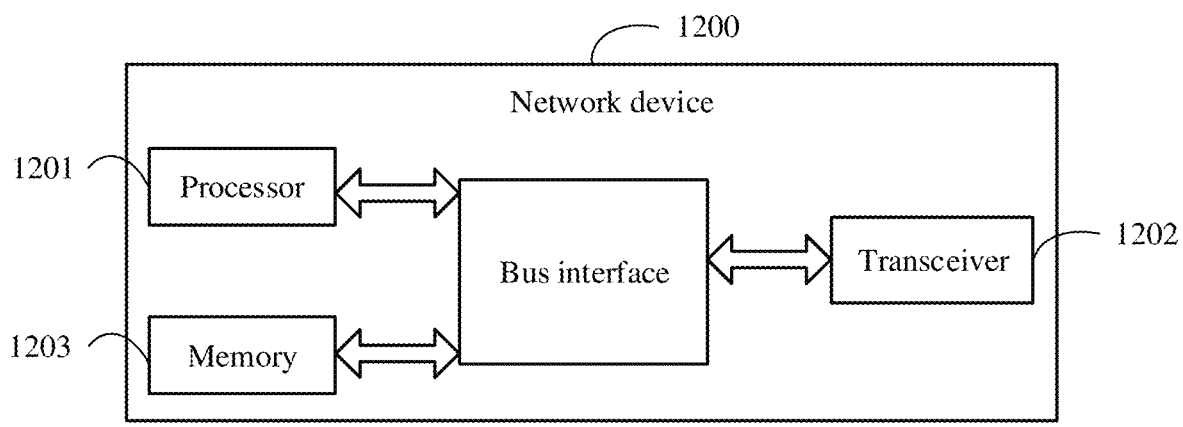
FIG. 11 is a structural block diagram of a network device according to some embodiments of this disclosure.

As shown in FIG. 11, some embodiments of this disclosure further provide a network device 1200, including a processor 1201, a transceiver 1202, a memory 1203, and a bus interface, where the processor 1201 is configured to read a program in the memory 1203 to perform the following process:

obtaining HARQ entities and MAC entities corresponding to a plurality of transmission carriers, where the transmission carriers include beams or transmission points; and performing data transmission between the transmission carriers and the HARQ entities and MAC entities corresponding to the transmission carriers.

In FIG. 11, a bus architecture may include any quantity of interconnect buses and bridges, specifically for interconnecting various circuits of one or more processors represented by the processor 1201 and a memory represented by the memory 1203. The bus architecture may further interconnect various other circuits such as a peripheral device, a voltage regulator, and a power management circuit. These are all well known in the art, and therefore are not further described in this specification. The bus interface provides an interface. The transceiver 1202 may be a plurality of components, that is, the transceiver 1202 includes a transmitter and a receiver, and provides a unit for communicating with various other apparatuses on a transmission medium.

The processor 1201 is responsible for bus architecture management and general processing. The memory 1203 may store data used when the processor 1201 performs an operation.

Optionally, by reading the program in the memory 1203, the processor 1201 is further configured to perform the following:

configuring the corresponding HARQ entities and MAC entities for the plurality of transmission carriers based on mapping relationship information between HARQ and transmission carriers, where the mapping relationship information is configured by the network device or prescribed by a protocol; or obtaining HARQ entities and MAC entities configured by a terminal for the plurality of transmission carriers.

Optionally, the mapping relationship information between HARQ and transmission carriers includes:

information about a transmission carrier; and
HARQ configuration information corresponding to the information about the transmission carrier, where the information about the transmission carrier includes at least one of a transmission carrier identifier, a cell identifier corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

Optionally, by reading the program in the memory 1203, the processor 1201 is further configured to perform the following:

configuring different HARQ entities for different transmission carriers.

Optionally, the HARQ configuration information corresponding to the information about the transmission carrier includes a quantity of HARQ processes.

Optionally, by reading the program in the memory 1203, the processor 1201 is further configured to perform the following:

configuring a same HARQ entity for the plurality of transmission carriers, and configuring different HARQ process IDs for different transmission carriers.

The HARQ configuration information corresponding to the information about the transmission carrier includes at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

Optionally, by reading the program in the memory 1203, the processor 1201 is further configured to perform the following:

configuring different HARQ entities for different transmission carriers, and configuring different MAC entities for different transmission carriers.

Optionally, the mapping relationship information between HARQ and transmission carriers further includes MAC configuration information corresponding to the transmission carrier, and the HARQ configuration information corresponding to the information about the transmission carrier includes a quantity of HARQ processes.

Optionally, the MAC configuration information corresponding to the transmission carrier includes at least one of the following:

identifier information of a MAC entity;
one or more logical channel identifiers corresponding to identifier information of a MAC entity;
one or more DRB identifiers corresponding to identifier information of a MAC entity;
one or more data flow identifiers corresponding to identifier information of a MAC entity; or
one or more session identifiers corresponding to identifier information of a MAC entity.

Optionally, the transmission carrier identifier includes at least one of a SSB identifier, a CSI-RS identifier, or a port number identifier corresponding to a reference signal, and the reference signal includes an SSB and/or a CSI-RS.

Optionally, the control channel identifier corresponding to the transmission carrier includes at least one of a control channel type identifier, a resource position identifier of a control channel, a reference signal identifier of a control channel, or a port number identifier corresponding to a reference signal of a control channel.

Optionally, by reading the program in the memory 1203, the processor 1201 is further configured to perform the following:

in a case of downlink data transmission, transmitting data to be transmitted to each transmission carrier, to a MAC entity and a HARQ entity corresponding to the transmission carrier, for processing; and/or
in a case of uplink data reception, transmitting data received by each transmission carrier to a MAC entity and a HARQ entity corresponding to the transmission carrier, for processing.

Optionally, by reading the program in the memory 1203, the processor 1201 is further configured to perform the following:

in the case of downlink data transmission, obtaining information about a third target transmission carrier; and determining the third target transmission carrier based on the information about the third target transmission carrier, and transmitting data to be transmitted to the third target transmission carrier, to a MAC entity and a HARQ entity corresponding to the third target transmission carrier, for processing; and
in the case of uplink data reception, obtaining information about a fourth target transmission carrier; and determining the fourth target transmission carrier based on the information about the fourth target transmission carrier, and transmitting data received by the fourth target transmission carrier to a MAC entity and a HARQ entity corresponding to the fourth target transmission carrier, for processing.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

It may be understood that the embodiments described in the embodiments of this disclosure may be implemented by hardware, software, firmware, middleware, microcode, or a combination thereof. For hardware implementation, the processing unit may be implemented in one or more application specific integrated circuits (Application Specific Integrated Circuit, ASIC), digital signal processors (DSP), digital signal processors devices (DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be a magnetic disk, an optical disc, a ROM, a RAM, or the like.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A data transmission method, applied to a terminal and comprising:
    obtaining hybrid automatic repeat request (HARQ) entities and medium access control (MAC) entities corresponding to a plurality of transmission carriers, wherein the transmission carriers are beams; and
    performing data transmission between the transmission carriers and the HARQ entities and MAC entities corresponding to the transmission carriers; wherein
    the obtaining HARQ entities and the MAC entities corresponding to the plurality of transmission carriers comprises:
        configuring the HARQ entities and the MAC entities for the plurality of transmission carriers based on mapping relationship information between HARQ and transmission carriers; or
        obtaining the HARQ entities and the MAC entities configured by a network device for the plurality of transmission carriers based on the mapping relationship information between HARQ and transmission carriers; wherein
    the mapping relationship information between HARQ and transmission carriers comprises:
        information about a transmission carrier; and
        HARQ configuration information corresponding to the information about the transmission carrier, wherein
    the information about the transmission carrier comprises at least one of a frequency identifier corresponding to the transmission carrier, a bandwidth part (BWP) identifier corresponding to the transmission carrier, or a control channel identifier corresponding to the transmission carrier.

2. The data transmission method according to claim 1, wherein
    the information about the transmission carrier further comprises at least one of a transmission carrier identifier, a cell identifier corresponding to the transmission carrier, or a MAC entity identifier corresponding to the transmission carrier.

3. The data transmission method according to claim 2, wherein the configuring the HARQ entities and MAC entities for the plurality of transmission carriers comprises:
    configuring different HARQ entities for different transmission carriers.

4. The data transmission method according to claim 3, wherein the HARQ configuration information corresponding to the information about the transmission carrier comprises a quantity of HARQ processes.

5. The data transmission method according to claim 2, wherein the configuring the HARQ entities and MAC entities for the plurality of transmission carriers comprises:
    configuring a same HARQ entity for the plurality of transmission carriers, and configuring different HARQ process IDs for different transmission carriers.

6. The data transmission method according to claim 5, wherein the HARQ configuration information corresponding to the information about the transmission carrier comprises at least one of an identifier of a HARQ entity corresponding to the transmission carrier, a HARQ process ID available to the transmission carrier, a total quantity of available HARQ processes of a HARQ entity corresponding to the transmission carrier, or a quantity of HARQ processes available to the transmission carrier.

7. The data transmission method according to claim 2, wherein the configuring the HARQ entities and MAC entities for the plurality of transmission carriers comprises:

configuring different HARQ entities for different transmission carriers, and configuring different MAC entities for different transmission carriers.

8. The data transmission method according to claim 7, wherein the mapping relationship information between HARQ and transmission carriers further comprises MAC configuration information corresponding to the transmission carrier, and the HARQ configuration information corresponding to the information about the transmission carrier comprises a quantity of HARQ processes.

9. The data transmission method according to claim 8, wherein the MAC configuration information corresponding to the transmission carrier comprises at least one of:
   identifier information of a MAC entity;
   one or more logical channel identifiers corresponding to identifier information of a MAC entity;
   one or more data radio bearer (DRB) identifiers corresponding to identifier information of a MAC entity;
   one or more data flow identifiers corresponding to identifier information of a MAC entity; or
   one or more session identifiers corresponding to identifier information of a MAC entity.

10. The data transmission method according to claim 2, wherein the transmission carrier identifier comprises at least one of a synchronization signal block (SSB) identifier, a channel state information reference signal (CSI-RS) identifier, or a port number identifier corresponding to a reference signal, and the reference signal comprises an SSB and/or a CSI-RS.

11. The data transmission method according to claim 2, wherein the control channel identifier corresponding to the transmission carrier comprises at least one of a control channel type identifier, a resource position identifier of a control channel, a reference signal identifier of a control channel, or a port number identifier corresponding to a reference signal of a control channel.

12. The data transmission method according to claim 2, wherein the performing data transmission between the transmission carriers and the HARQ entities and MAC entities corresponding to the transmission carriers comprises:
   in a case of downlink data reception, transmitting data received by each transmission carrier to a MAC entity and a HARQ entity corresponding to the transmission carrier, for processing; and/or
   in a case of uplink data transmission, transmitting data to be transmitted to each transmission carrier, to a MAC entity and a HARQ entity corresponding to the transmission carrier, for processing.

13. The data transmission method according to claim 12, wherein the transmitting data received by each transmission carrier to a MAC entity and a HARQ entity corresponding to the transmission carrier, for processing in a case of downlink data reception comprises:
   in the case of downlink data reception, obtaining information about a first target transmission carrier;
   determining the first target transmission carrier based on the information about the first target transmission carrier;
   transmitting data received by the first target transmission carrier to a MAC entity and a HARQ entity corresponding to the first target transmission carrier, for processing; and
   the transmitting data to be transmitted to each transmission carrier, to a MAC entity and a HARQ entity corresponding to the transmission carrier, for processing in a case of uplink data transmission comprises:
   in the case of uplink data transmission, obtaining information about a second target transmission carrier; and
   determining the second target transmission carrier based on the information about the second target transmission carrier;
   transmitting data to be transmitted to the second target transmission carrier, to a MAC entity and a HARQ entity corresponding to the second target transmission carrier, for processing.

14. A data transmission method, applied to a network device and comprising:
   obtaining hybrid automatic repeat request (HARQ) entities and medium access control (MAC) entities corresponding to a plurality of transmission carriers, wherein the transmission carriers are beams; and
   performing data transmission between the transmission carriers and the HARQ entities and MAC entities corresponding to the transmission carriers; wherein
   the obtaining the HARQ entities and the MAC entities corresponding to the plurality of transmission carriers comprises:
      configuring the HARQ entities and the MAC entities for the plurality of transmission carriers based on mapping relationship information between HARQ and transmission carriers; or
      obtaining the HARQ entities and the MAC entities configured by a terminal for the plurality of transmission carriers based on the mapping relationship information between HARQ and transmission carriers; wherein
   the mapping relationship information between HARQ and transmission carriers comprises:
      information about a transmission carrier; and
      HARQ configuration information corresponding to the information about the transmission carrier, wherein
   the information about the transmission carrier comprises at least one of a frequency identifier corresponding to the transmission carrier, a bandwidth part (BWP) identifier corresponding to the transmission carrier, or a control channel identifier corresponding to the transmission carrier.

15. A terminal, comprising:
   a processor configured to obtain hybrid automatic repeat request (HARQ) entities and medium access control (MAC) entities corresponding to a plurality of transmission carriers, wherein the transmission carriers are beams; and
   a radio frequency unit configured to perform data transmission between the transmission carriers and the HARQ entities and MAC entities corresponding to the transmission carriers; wherein
   the processor is configured to: configure the HARQ entities and the MAC entities for the plurality of transmission carriers based on mapping relationship information between HARQ and transmission carriers; or
   the processor is configured to: obtain the HARQ entities and the MAC entities configured by a network device for the plurality of transmission carriers based on the mapping relationship information between HARQ and transmission carriers; wherein
   the mapping relationship information between HARQ and transmission carriers comprises:
      information about a transmission carrier; and
      HARQ configuration information corresponding to the information about the transmission carrier, wherein the information about the transmission carrier comprises at least one of a frequency identifier corresponding to the transmission carrier, a bandwidth part (BWP) identifier corresponding to the transmission carrier, or a control channel identifier corresponding to the transmission carrier.

16. The terminal according to claim 15, wherein
the information about the transmission carrier further comprises at least one of a transmission carrier identifier, a cell identifier corresponding to the transmission carrier, or a MAC entity identifier corresponding to the transmission carrier.

17. The terminal according to claim 16, wherein the processor is configured to configure different HARQ entities for different transmission carriers;
the processor is configured to configure a same HARQ entity for the plurality of transmission carriers, and configure different HARQ process IDs for different transmission carriers; or
the processor is configured to configure different HARQ entities for different transmission carriers, and configure different MAC entities for different transmission carriers.

18. The terminal according to claim 16, wherein the transmission carrier identifier comprises at least one of a synchronization signal block (SSB) identifier, a channel state information reference signal (CSI-RS) identifier, or a port number identifier corresponding to a reference signal, and the reference signal comprises an SSB and/or a CSI-RS.

19. The terminal according to claim 16, wherein the control channel identifier corresponding to the transmission carrier comprises at least one of a control channel type identifier, a resource position identifier of a control channel, a reference signal identifier of a control channel, or a port number identifier corresponding to a reference signal of a control channel.

20. The terminal according to claim 16, wherein the processor is configured to:
in a case of downlink data reception, transmit data received by each transmission carrier to a MAC entity and a HARQ entity corresponding to the transmission carrier, for processing; and/or
in a case of uplink data transmission, transmit data to be transmitted to each transmission carrier, to a MAC entity and a HARQ entity corresponding to the transmission carrier, for processing.

\* \* \* \* \*